United States Patent
Hu et al.

(10) Patent No.: US 12,058,387 B2
(45) Date of Patent: Aug. 6, 2024

(54) VIDEO PROCESSING METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Guangpu Hu, Shenzhen (CN); Peng Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 162 days.

(21) Appl. No.: 17/732,486

(22) Filed: Apr. 28, 2022

(65) Prior Publication Data
US 2022/0256205 A1    Aug. 11, 2022

Related U.S. Application Data

(63) Continuation of application No. PCT/CN2021/091889, filed on May 6, 2021.

(30) Foreign Application Priority Data

May 21, 2020   (CN) .......................... 202010433505.2

(51) Int. Cl.
H04N 21/234 (2011.01)
H04N 21/438 (2011.01)
H04N 21/44 (2011.01)

(52) U.S. Cl.
CPC ......... *H04N 21/234* (2013.01); *H04N 21/438* (2013.01); *H04N 21/44008* (2013.01)

(58) Field of Classification Search
None
See application file for complete search history.

(56) References Cited

U.S. PATENT DOCUMENTS

2008/0029199 A1   2/2008   Hornby
2009/0070324 A1   3/2009   Yoshino
(Continued)

FOREIGN PATENT DOCUMENTS

CN   101945129 A   1/2011
CN   102497387 A   6/2012
(Continued)

OTHER PUBLICATIONS

The World Intellectual Property Organization (WIPO) International Search Report for PCT/CN2021/091889 Jul. 21, 2021 5 Pages (including translation).

(Continued)

*Primary Examiner* — Omar S Parra
(74) *Attorney, Agent, or Firm* — ANOVA LAW GROUP, PLLC

(57) ABSTRACT

A video processing method includes: acquiring video substreams through at least two channels, to obtain at least two video substreams each having a one-to-one correspondence with one of the at least two channels (S202); extracting video slice numbers from supplemental enhancement information (SEI) frames of the at least two video substreams (S204); determining a missing video slice missed from a target video substream of the at least two video substreams according to the extracted video slice numbers (S206); downloading the missing video slice from a video source corresponding to the target video substream (S208); and playing the downloaded video slice and the at least two video substreams according to a sequence of the video slice numbers (S210).

20 Claims, 9 Drawing Sheets

(56) References Cited

U.S. PATENT DOCUMENTS

| | | | |
|---|---|---|---|
| 2013/0263201 A1 | 10/2013 | Chung-How et al. | |
| 2017/0105010 A1* | 4/2017 | Wu | H04N 21/85406 |
| 2018/0013174 A1 | 1/2018 | Endo et al. | |
| 2019/0058898 A1 | 2/2019 | Holtzman et al. | |
| 2020/0177926 A1* | 6/2020 | Zhong | H04N 19/51 |

FOREIGN PATENT DOCUMENTS

| | | | |
|---|---|---|---|
| CN | 104967685 A | 10/2015 | |
| CN | 105142035 A | 12/2015 | |
| CN | 107277558 A | 10/2017 | |
| CN | 108055594 A | 5/2018 | |
| CN | 109819266 A | 5/2019 | |
| CN | 111343504 A | 6/2020 | |
| EP | 2814194 A1 | 12/2014 | |
| JP | 2004080145 A | 3/2004 | |
| JP | 2009065551 A | 3/2009 | |

OTHER PUBLICATIONS

The State Intellectual Property Office of the People's Republic of China (SIPO) Office Action 1 for for 202010433505.2 Jul. 3, 2020 16 Pages (including translation).
The State Intellectual Property Office of the People's Republic of China (SIPO) Office Action 2 for for 202010433505.2 Aug. 5, 2020 6 Pages (including translation).
The Japan Patent Office (JPO) Notification of Reasons for Refusal for Application No. 2022-539104 and Translation Aug. 18, 2023 8 Pages.

* cited by examiner

VIDEO PROCESSING METHOD AND APPARATUS, COMPUTER DEVICE, AND STORAGE MEDIUM

CROSS-REFERENCES TO RELATED APPLICATIONS

This application is a continuation application of PCT Patent Application No. PCT/CN2021/091889, entitled "VIDEO PROCESSING METHOD AND APPARATUS, AND COMPUTER DEVICE AND STORAGE MEDIUM" and filed on May 6, 2021, which claims priority to Chinese Patent Application No. 202010433505.2, entitled "VIDEO PROCESSING METHOD AND APPARATUS, COMPUTER DEVICE, AND STORAGE MEDIUM" and filed on May 21, 2020, the entire contents of both of which are incorporated herein by reference.

FIELD OF THE TECHNOLOGY

The present disclosure relates to the field of video processing technologies, and in particular, to a video processing method and apparatus, a computer device, and a storage medium.

BACKGROUND OF THE DISCLOSURE

With the continuous development of video processing technologies and Internet technologies, more users can choose to watch their favorite videos by connecting to the Internet using clients, which provides great convenience for the majority of users. Lag is an important indicator to analyze the quality of video playing. In conventional video playing solutions, in order to avoid lagging during video playing, a client usually buffers a portion of video data, and this period during which the video data is buffered is referred to as a protection window.

However, in the conventional video playing solutions, clients acquire video data from a server through a specified protocol. When the number of clients reaches a certain scale, the server is under huge pressure of input/output (I/O), bandwidth, and the like. If the server cannot process a client request in time, the client has a lag problem.

In order to resolve the above problem, a portion of video data can be downloaded from a video source (such as another server or another client) during video playing, to relieve processing pressure on the server to avoid lagging. In order to download the portion of video data from the video source, a delay needs to be added on the basis of the protection window for video data transmission. That is, in addition to downloading video data to be played from the server, the video data to be played is also downloaded from another video source, which can greatly reduce pressure on the server. However, using the conventional video playing solutions further increases playing delay time.

SUMMARY

According to various embodiments of the present disclosure, a video processing method and apparatus, a computer device, and a storage medium are provided.

A video processing method is provided, performed by a terminal, including: acquiring video substreams through at least two channels, to obtain at least two video substreams each having a one-to-one correspondence with one of the at least two channels; extracting video slice numbers from supplemental enhancement information (SEI) frames of the at least two video substreams; determining a missing video slice missed from a target video substream of the at least two video substreams according to the extracted video slice numbers; downloading the missing video slice from a video source corresponding to the target video substream; and playing the downloaded video slice and the at least two video substreams according to a sequence of the video slice numbers.

A video processing apparatus is provided, including: a first downloading module, configured to acquire video substreams through at least two channels, to obtain at least two video substreams each having a one-to-one correspondence with one of the at least two channels; an extraction module, configured to extract video slice numbers from SEI frames of the at least two video substreams; a determining module, configured to determine a missing video slice missed from a target video substream of the at least two video substreams according to the extracted video slice numbers; a second downloading module, configured to download the missing video slice from a video source corresponding to the target video substream; and a playing module, configured to play the downloaded video slice and the at least two video substreams according to a sequence of the video slice numbers.

A computer device is provided, including a memory and a processor, the memory storing a computer program, and the processor, when executing the computer program, performing the following operations: acquiring video substreams through at least two channels, to obtain at least two video substreams each having a one-to-one correspondence with one of the at least two channels; extracting video slice numbers from SEI frames of the at least two video substreams; determining a missing video slice missed from a target video substream of the at least two video substreams according to the extracted video slice numbers; downloading the missing video slice from a video source corresponding to the target video substream; and playing the downloaded video slice and the at least two video substreams according to a sequence of the video slice numbers.

A non-transitory computer-readable storage medium is provided, storing a computer program, the computer program, when executed by a processor, performing the following operations: acquiring video substreams through at least two channels, to obtain at least two video substreams each having a one-to-one correspondence with one of the at least two channels; extracting video slice numbers from SEI frames of the at least two video substreams; determining a missing video slice missed from a target video substream of the at least two video substreams according to the extracted video slice numbers; downloading the missing video slice from a video source corresponding to the target video substream; and playing the downloaded video slice and the at least two video substreams according to a sequence of the video slice numbers.

Details of one or more embodiments of the present disclosure are provided in the accompanying drawings and descriptions below. Other features and advantages of the present disclosure become clearer from the specification, the accompanying drawings, and the claims.

DESCRIPTION OF EMBODIMENTS

To make objectives, technical solutions, and advantages of the present disclosure clearer and more comprehensible, the present disclosure is further described in detail with reference to the accompanying drawings and embodiments. It is to be understood that the specific embodiments described herein are only used for explaining the present disclosure, and are not used for limiting the present disclosure.

Figure 1:
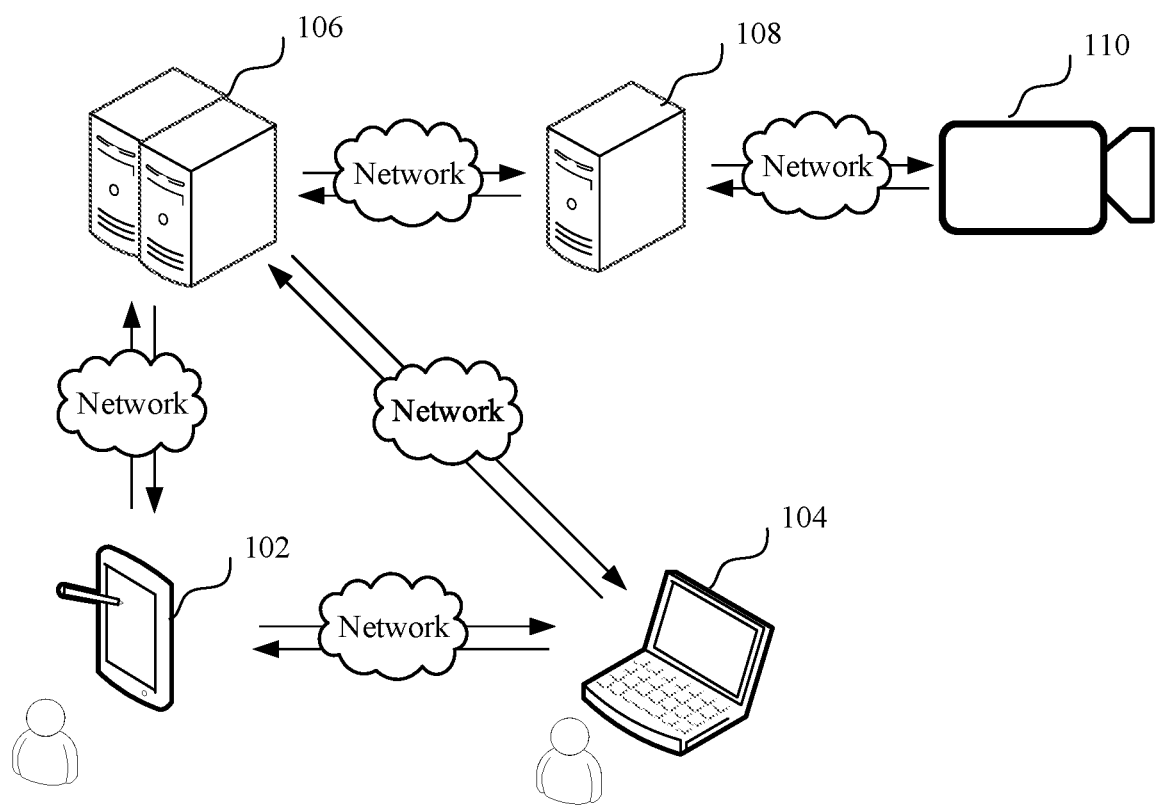
FIG. 1 is a diagram of an application environment of a video processing method according to an embodiment.

A video processing method provided in the present disclosure may be applied to an application environment shown in FIG. 1. A terminal 102, a terminal of another user (hereinafter referred to as another terminal for short) 104, a target server 106 in a content delivery network (CDN) system, a transcoding server (which may be referred to as a server for short) 108, and a video capture system 110 communicate through a network, as shown in FIG. 1. The terminal 102 downloads a video stream through at least two channels (for example, downloads the video stream from the target server 106 in the CDN system or the another terminal 104), to obtain at least two video substreams; extracts video slice numbers from SEI frames of the at least two video substreams; determines a missing video slice missed from a target video substream of the at least two video substreams according to the extracted video slice numbers; downloads the missing video slice from a video source corresponding to the target video substream; and writes the downloaded video slice and the at least two video substreams into a client for playing according to a sequence of the video slice numbers.

A video playing client application (hereinafter abbreviated as a client) is installed on the terminal 102 for video playing. When the another terminal 104 needs to play a video, the video stream may be downloaded from the target server 106, or a portion of the video stream may be downloaded from the terminal 102 (that is, a video substream is downloaded). The terminal 102 and the another terminal 104 may include, but are not limited to, a personal computer, a notebook computer, a smartphone, a tablet computer, and a portable wearable device. The target server 106 and the transcoding server 108 may be implemented by using an independent server or a server cluster that includes a plurality of servers.

Figure 2:
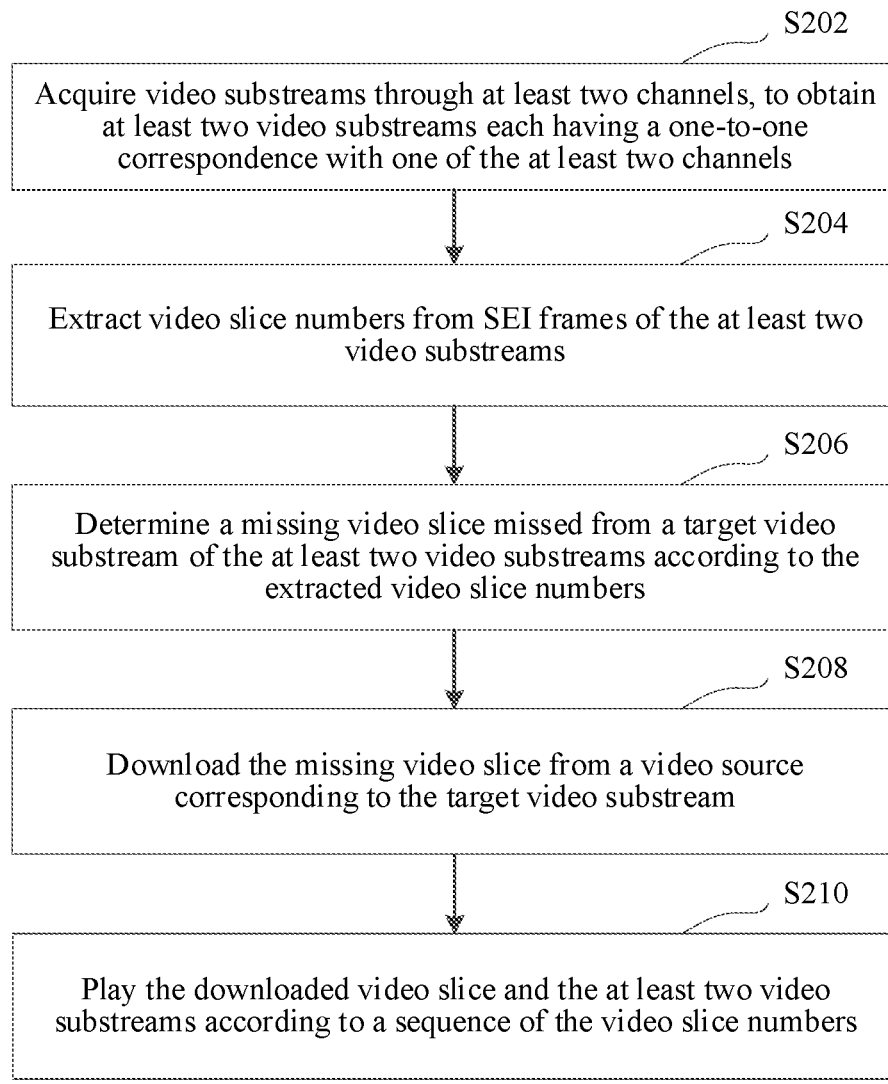
FIG. 2 is a schematic flowchart of a video processing method according to an embodiment.

In an embodiment, FIG. 2 shows a video processing method according to an embodiment of the present disclosure. Description is given by using an example in which the method is applied to the terminal 102 in FIG. 1. The method includes the following steps:

S202. Acquire video substreams through at least two channels, to obtain at least two video substreams each having a one-to-one correspondence with one of the at least two channels.

A video stream may be a live video stream, a recorded video stream, or another video stream in a non-live form. The video stream may be divided into two or more video substreams before or during downloading the video stream.

The live video stream may include video slices of a live video. The recorded video stream may include video slices of a pre-recorded video. Each video slice may be composed of one or more video frames. In the subsequent embodiments, description is given by using an example in which the video stream is a live video stream and the video slice is composed of one video frame.

In addition, each video slice may be obtained by encapsulating the video frame by using a specific video format. The video format may include, but is not limited to, an FLV streaming media format, a Real Media Variable Bitrate (RMVB) format, a Moving Picture Experts Group (MPEG) format, an Audio Video Interleaved (AVI) format, and the like.

When the video stream is a live video stream, the video substream may be composed of video slices in the live video stream. For example, if the live video stream is 1, 2, 3, . . . , 4n−3, correspondingly, a first video substream may be 0, 4, 8, . . . , 4n; a second video substream may be 1, 5, 9, . . . , 4n+1; a third video substream may be 2, 6, 10, . . . , 4n+2; and a fourth video substream may be 3, 7, 11, 4n+3. n is a positive integer greater than or equal to 0.

In an embodiment, the video stream is obtained by a transcoding server slicing an original video stream pushed by a video capture system sequentially; and the video slice numbers are obtained by the transcoding server numbering sliced video slices.

The original video stream includes an original live video stream, and a video format of the original live video stream may include, but is not limited to, an FLV streaming media format, an RMVB format, an MPEG format, an AVI format, and the like. In the subsequent embodiments, description is given by using an example in which the original live video stream and the live video stream are video streams in an FLV streaming media format.

Specifically, the transcoding server receives the original video stream in a target video format pushed by a video capture system, transcodes the original video stream sequentially, and slices the original video stream during the transcoding, to obtain corresponding video slices; numbers the obtained video slices, to obtain video slice numbers; saves the video slice numbers in an SEI frame, to obtain a transcoded and numbered video stream; transmits a sliced video stream to a target server in a CDN system, so that the target server returns the corresponding video stream according to a video playing instruction transmitted by a client. The client is a client installed on the terminal for video playing.

In an embodiment, the video capture system shoots a target object to obtain video data, and then encapsulates the obtained video data by using a specific video format, to obtain the original video stream including a plurality of video data packets.

For example, when the video stream is a live video stream, the video capture system encapsulates the video data according to an FLV streaming media format, to obtain a live video stream in the FLV streaming media format.

For step S202, at an initial period of playing, the terminal (e.g., a first terminal) may download the video stream only from the target server in the CDN system. After the initial period of playing ends (that is, after video streams played at the initial period are downloaded), the terminal may download the video stream from the target server in the CDN system and another client. In addition, after the initial period of playing ends, the terminal may further download the video stream only from the another client. The another client may refer to a client application that is installed on another terminal (e.g., a second terminal) and that may be used for video playing. The another client is a same or similar video playing application as the one installed on the first terminal. Therefore, S202 may be described in the following scenarios:

Scenario 1. At the initial period of playing, the terminal downloads the video stream only from the target server in the CDN system.

In an embodiment, S202 may specifically include: The terminal divides a video stream to be downloaded into at least two video substreams; and downloads the at least two video substreams from the target server in the CDN system. For example, the terminal may divide a video stream of 0s to 30s or 10s to 30s into four video substreams, and download the four video substreams from the target server in the CDN system.

In an embodiment, the terminal divides the video stream to be downloaded into at least two substreams according to a preset numbering rule. In this case, the terminal may download the video substreams from the target server in the CDN system.

For example, when the video stream is a live video stream, the live video stream is divided into four video substreams, which are specifically shown as follows:

(1) The first video substream: A video slice numbered 4n is converted into the first video substream. For example, video slices numbered 0, 4, 8, . . . are converted into the first video substream. The terminal downloads the first video substream from the target server in the CDN system.

(2) The second video substream: A video slice numbered 4n+1 is converted into the second video substream. For example, video slices numbered 1, 5, 9, . . . are converted into the second video substream. The terminal downloads the second video substream from the target server in the CDN system.

(3) The third video substream: A video slice numbered 4n+2 is converted into the third video substream. For example, video slices numbered 2, 6, 10, . . . are converted into the third video substream. The terminal downloads the third video substream from the target server in the CDN system.

(4) The fourth video substream: A video slice numbered 4n+3 is converted into the fourth video substream. For example, video slices numbered 3, 7, 11, . . . are converted into the fourth video substream. The terminal downloads the fourth video substream from the target server in the CDN system.

During the downloading, the first video substream, the second video substream, the third video substream, and the fourth video substream may be downloaded simultaneously from the target server in the CDN system. n is a positive integer greater than or equal to 0.

Scenario 2. After the initial period of playing ends, the terminal may download the video stream from the target server in the CDN system and the another client.

In an embodiment, the terminal establishes a communication connection with at least one another client by using the client. S202 may specifically include: The terminal downloads at least one video substream from the another client; and downloads one or more remaining video substreams of the video substreams from the target server in the CDN system, to reduce load pressure on the target server.

For example, when the video stream is a live video stream, the terminal may divide a live video stream of 0s to 30s or 10s to 30s into four video substreams, download two video substreams from the another client, and pause the download of the two video substreams from the target server in the CDN system. In addition, the terminal downloads the other two video substreams from the target server in the CDN system.

In an embodiment, the step of downloading at least one video substream from the another client may specifically include: The terminal selects at least one candidate video substream from the at least two video substreams; and downloads the candidate video substream from the another client. The method further includes: The terminal pauses the download of the candidate video substream from the target server when determining to download the candidate video substream from the another client. In this way, the load pressure on the target server can be reduced, and duplicate download of the video substream can be avoided.

The candidate video substream may be downloaded from a content delivery server before the candidate video substream is downloaded from the another client. The terminal pauses the download of the candidate video substream from the target server when determining to download the candidate video substream from the another client.

In an embodiment, when establishing a communication connection with the another client and selecting the at least one candidate video substream, the terminal may determine to download the candidate video substream from the another client. In this case, the terminal may download the candidate video substream from the another client, and pauses the download of the candidate video substream from the target server.

In an embodiment, the terminal divides the video stream to be downloaded into at least two video substreams according to the preset numbering rule, downloads at least one video substream from the another client, and downloads one or more remaining video substreams of the video substreams from the target server in the CDN system.

For example, when the video stream is a live video stream, the live video stream is divided into four video substreams for downloading, which are specifically shown as follows:

(1) The first video substream: The terminal downloads the first video substream from the another client, and pauses the download of the first video substream from the target server in the CDN system.

(2) The second video substream: The terminal downloads the second video substream from the another client, and pauses the download of the second video substream from the target server in the CDN system.

(3) The third video substream: The terminal downloads the third video substream from the target server in the CDN system.

(4) The fourth video substream: The terminal downloads the fourth video substream from the target server in the CDN system.

Scenario 3. After the initial period of playing ends, the terminal may download the video stream only from the another client.

In an embodiment, the terminal establishes a communication connection with at least one another client by using the client. S202 may specifically include: The terminal downloads the at least two video substreams from the another client.

For example, when the video stream is a live video stream, the terminal may divide the live video stream of 0s to 30s or 10s to 30s into four, and download four video substreams from the another client.

In an embodiment, the terminal divides the video stream to be downloaded into at least two video substreams according to the preset numbering rule, and downloads the at least two video substreams from the another client.

For example, when the video stream is a live video stream, the live video stream is divided into four video substreams for downloading, which are specifically shown as follows:

(1) The first video substream: The terminal downloads the first video substream from the another client, and pauses the download of the first video substream from the target server in the CDN system.

(2) The second video substream: The terminal downloads the second video substream from the another client, and pauses the download of the second video substream from the target server in the CDN system.

(3) The third video substream: The terminal downloads the third video substream from the another client, and pauses the download of the third video substream from the target server in the CDN system.

(4) The fourth video substream: The terminal downloads the fourth video substream from the another client, and pauses the download of the fourth video substream from the target server in the CDN system.

S204. Extract video slice numbers from SEI frames of the at least two video substreams.

The SEI frame is used to add additional information to the video stream, and is integrated in the video stream.

In an embodiment, the terminal locates the SEI frames from the video substreams, and extracts video slice numbers from the SEI frames.

S206. Determine a missing video slice missed from a target video substream of the at least two video substreams according to the extracted video slice numbers.

In an embodiment, S206 may specifically include: The terminal determines whether a video slice number is missing in the at least two video substreams; and determining, when the video slice number is missing in at least one video substream, a missing video slice in the at least one video substream according to the missing video slice number.

In an embodiment, when the terminal downloads the video stream by dividing the video stream into substreams, each video substream is usually downloaded according to a sequence of the video slice numbers. Therefore, the video slice numbers in each downloaded video substream are continuous and have a sequence. For example, video slice numbers of the first video substream are 0, 4, 8, 12, . . . , 4n.

In an embodiment, the terminal determines whether a video slice number is missing from the target video substream of the at least two video substreams according to the continuity of the video slice numbers. If yes, it is determined that the target video substream is not a complete data stream and S208 is performed. For example, if video slice numbers of a downloaded first video substream are 0, 4, 8, 16, . . . , 4n, according to the continuity of the video slices, the downloaded first video substream is incomplete, a video slice numbered 12 is missing, and the video slice numbered 12 needs to be downloaded immediately.

S208. Download the missing video slice from a video source corresponding to the target video substream.

The video source may be a target server in a CDN system, or may be another client. In some embodiments, multiple video slices may be determined as missing from one or video substreams. The multiple video slices may be downloaded from one or more video sources.

In an embodiment, when determining the video source corresponding to the missing video slice, the terminal downloads the missing video slice from the video source.

Specifically, when determining that the missing video slice corresponds to the target server in the CDN system, the terminal transmits a download request carrying the number of the missing video slice to the target server, to download the missing video slice from the target server. When determining that the missing video slice corresponds to the another client, the terminal transmits a download request carrying the number of the missing video slice to the another client, to download the missing video slice from the another client.

S210. Play the downloaded video slice and the at least two video substreams according to a sequence of the video slice numbers.

In an embodiment, the terminal loads the downloaded video slice and the at least two video substreams to a client according to a sequence of the video slice numbers, to play a video by using the client. The client may be an application installed on the terminal, and may specifically be a video client.

In an embodiment, S210 may specifically include: The terminal saves the downloaded video slice and the at least two video substreams; loads the saved video slices and video substreams to a client according to a sequence of the video slice numbers, to obtain a corresponding video stream to be played; rendering the video slices in the video stream to be played sequentially, to obtain an image sequence to be played; and playing the image sequence to be played by using the client.

In an embodiment, the terminal invokes a rendering tool to render video slices in the video stream to be played, to obtain a corresponding image sequence to be played, and plays the image sequence to be played by using the client.

For example, the terminal invokes Web Graphics Library (WebGL), Open Graphics Library for Embedded Systems (OpenGL ES), or OpenGL ES version 2.0 to render the video slices in the video stream to be played, to obtain the image sequence to be played.

In the foregoing embodiment, the video stream is obtained from at least two channels, which can reduce pressure on the server. The video slice numbers are extracted from SEI frames of video substreams, and one of the at least two video substreams in which a video slice is missing can be determined according to the extracted video slice numbers, so that the missing video slice can be quickly replenished from a corresponding video source, which greatly reduces video playing delay time.

Figure 3:
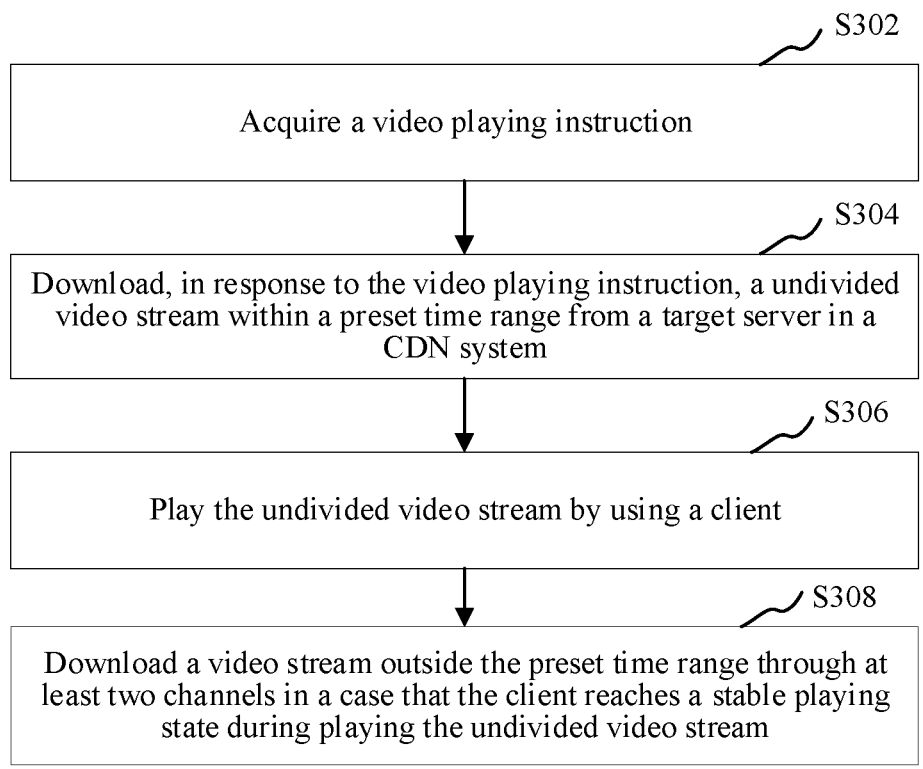
FIG. 3 is a schematic flowchart of steps of preloading and playing a video stream according to an embodiment.

In an embodiment, as shown in FIG. 3, before S202, the method may further include:

S302. Acquire a video playing instruction.

The video playing instruction may carry a video identifier of a video. For example, if a user wants to watch a final of a sports match, the video playing instruction carry a final identifier of the sports match.

In an embodiment, after starting a client, the terminal displays an entry page for video playing, generates a video playing instruction when detecting an input trigger operation on a video identifier to be played, transmits the video playing instruction to a target server in a CDN system, and switches the displayed entry page to a video playing page.

S304. Download, in response to the video playing instruction, an undivided video stream within a preset time range from a target server in a CDN system.

The undivided video stream within the preset time range and the foregoing at least two video substreams belong to data streams of the same video. The undivided video stream refers to all video data within the preset time range, such as video data within the first 5 seconds of the video.

In an embodiment, after obtaining the video playing instruction, the terminal transmits the video playing instruction to the target server in the CDN system, so that the target server acquires a corresponding undivided video stream within the preset time range according to the video identifier in the video playing instruction, and then transmits the undivided video stream to the client.

For example, if the video stream is a live video stream, the user starts watching a final live of a sports match from minute i, the complete live video stream within minutes i to i+1 may be downloaded from the target server in the CDN system first, so that the client can play the final video stably.

S306. Play the undivided video stream by using a client.

In an embodiment, the terminal invokes a rendering tool to render video slices in the undivided video stream, to obtain a corresponding image sequence to be played, and plays the image sequence to be played by using the client.

For example, if the video stream is a live video stream, the terminal invokes WebGL, or OpenGL ES, or OpenGL ES version 2.0 to render video slices in the complete live video stream, to obtain an image sequence to be played.

S308. Download a video stream outside the preset time range through the at least two channels when the client reaches a stable playing state during playing the undivided video stream.

The stable playing state may mean that the number of frames of a video played per unit of playing time is the same as the number of video frames corresponding to a preset frame rate, so that the video can be played smoothly without lagging. For example, for a video with a frame rate of 24 frames per second (fps), 24 frames need to be played within one second. If a playing speed of 24 fps can be achieved during playing, there is no lagging, indicating a stable playing state. If the video stream cannot be downloaded due to a network problem, or the decoding speed is excessively slow, causing that less than 24 frames are played within one second, lagging occurs, indicating an unstable playing state.

For S308, reference may be made to S202 in the foregoing embodiment.

In the foregoing embodiment, at an initial period of video playing, an undivided video stream is first downloaded from the target server in the CDN system for playing, to avoid lagging. When the video is played stably, the video stream is downloaded by being divided into substreams, which can reduce pressure on the server.

Figure 4:
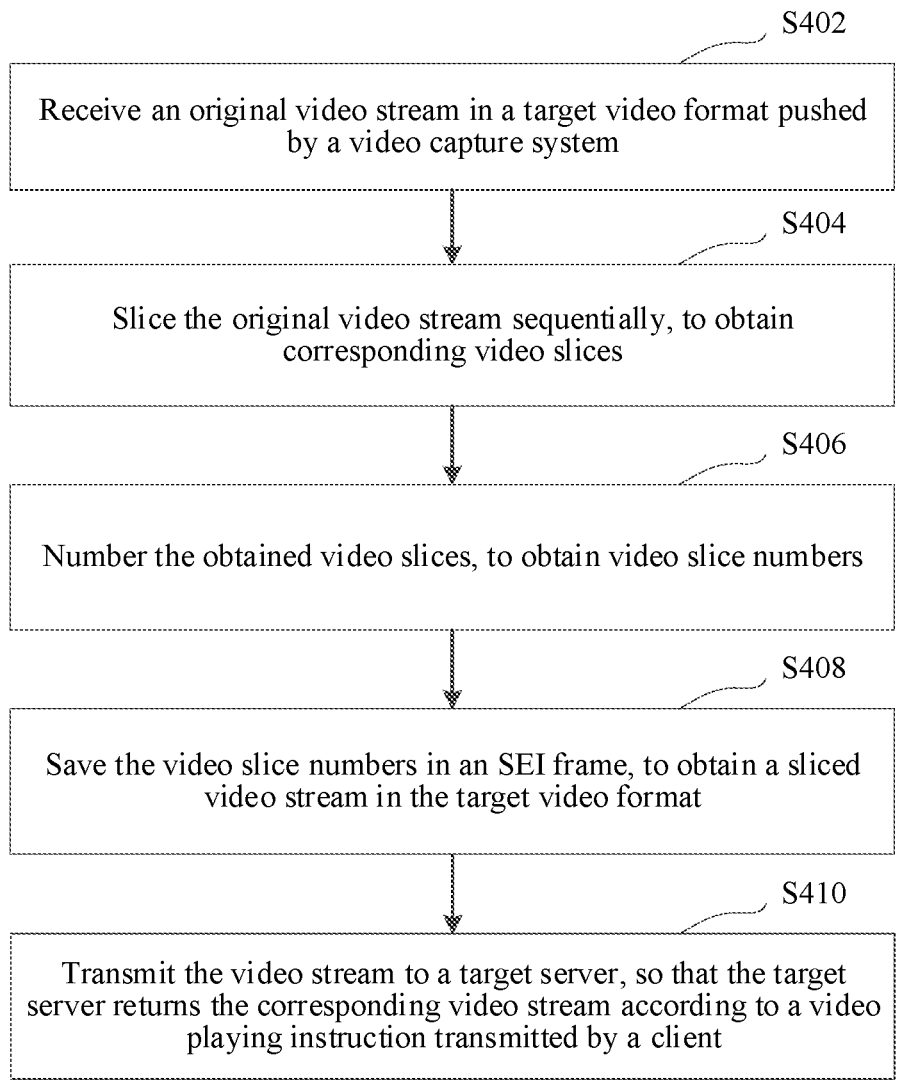
FIG. 4 is a schematic flowchart of a video processing method according to another embodiment.

In an embodiment, FIG. 4 shows a video processing method according to the present disclosure. Description is given by using an example in which the method is applied to the transcoding server (which may be referred to as the server for short) 108 in FIG. 1. The method includes the following steps:

S402. Receive an original video stream in a target video format pushed by a video capture system.

The original video stream may be an original live video stream, a recorded video stream, or another video stream in a non-live form. In the subsequent embodiments, description is given by using an example in which the original video stream is an original live video stream and the video slice is composed of one video frame.

The target video format may include, but is not limited to, an FLU streaming media format, an RMVB format, an MPEG format, an AVI format, and the like. The video capture system may be a dedicated video capture device, such as a video capture device for sports event streaming, a video capture device for press conference press streaming, a terminal device used in game streaming or other network streaming, and the like. In the subsequent embodiments, description is given by using an example in which the original video stream is a video stream in an FLV streaming media format.

In an embodiment, the transcoding server establishes a communication connection with the video capture system, and then receives the original video stream transmitted by the video capture system based on a real-time transport protocol. The real-time transport protocol may be the Real-Time Messaging Protocol (RTMP), the HTTP Live Streaming (HLS) Protocol, or the Web Real-Time Communication (WebRTC) Protocol.

S404. Slice the original video stream sequentially, to obtain corresponding video slices.

In an embodiment, the transcoding server transcodes the original video stream sequentially, and slices the original video stream during transcoding, to obtain the corresponding video slices.

S406. Number the obtained video slices, to obtain video slice numbers.

In an embodiment, the transcoding server numbers the obtained video slices according to a preset numbering rule, to obtain the video slice numbers.

S408. Save the video slice numbers in an SEI frame, to obtain a sliced video stream in the target video format.

After the original video stream is transcoded and sliced, the obtained video stream has the same format as the original video stream, and remains in the target video format. In the subsequent embodiments, description is given is described by using an example in which the video stream is a video stream in an FLV streaming media format.

The SEI frame is used to add additional information to the video stream, and is integrated in the video stream.

S410. Transmit the video stream to a target server, so that the target server returns the corresponding video stream according to a video playing instruction transmitted by a client.

In an embodiment, the transcoding server transmits the video stream to a target server in a CDN system, so that the target server returns the corresponding video stream according to the video playing instruction transmitted by the client.

In an embodiment, the transcoding server transmits the sliced video stream to the target server in the CDN system based on the real-time transport protocol, so that the target server returns the corresponding video stream according to the video playing instruction transmitted by the client.

The client may download the video stream from the target server through at least two channels, to obtain at least two video substreams. When a video slice is missing in the video substream, the missing video slice may be immediately replenished. The client may alternatively download the video substream from another client. For the processes of replenishing the missing video slice and downloading the video substream from the another client, reference may be made to S202 to S210 in the foregoing embodiment.

For example, when receiving a video playing instructions for a P2P sliced stream, the target server may divide the video stream into a plurality of video substreams and transmit the video substreams to the client. When receiving a video playing instruction for a non-P2P sliced stream, the target server may transmit the video stream directly to the client.

In addition, when the client establishes a communication connection with the another client and requests at least one video substream from the another client, the target server pauses the transmission of the at least one video substream to the client.

In the foregoing embodiment, the original video stream pushed by the video capture system is sliced, the obtained video slices are numbered, and the obtained video slice numbers are saved in the SEI frame, so that the client can determine whether there is a missing video slice by using the video slice numbers in the SEI frame, and the client can replenish the missing video slice in time, which reduces delay time when the client plays a video.

Figure 5:
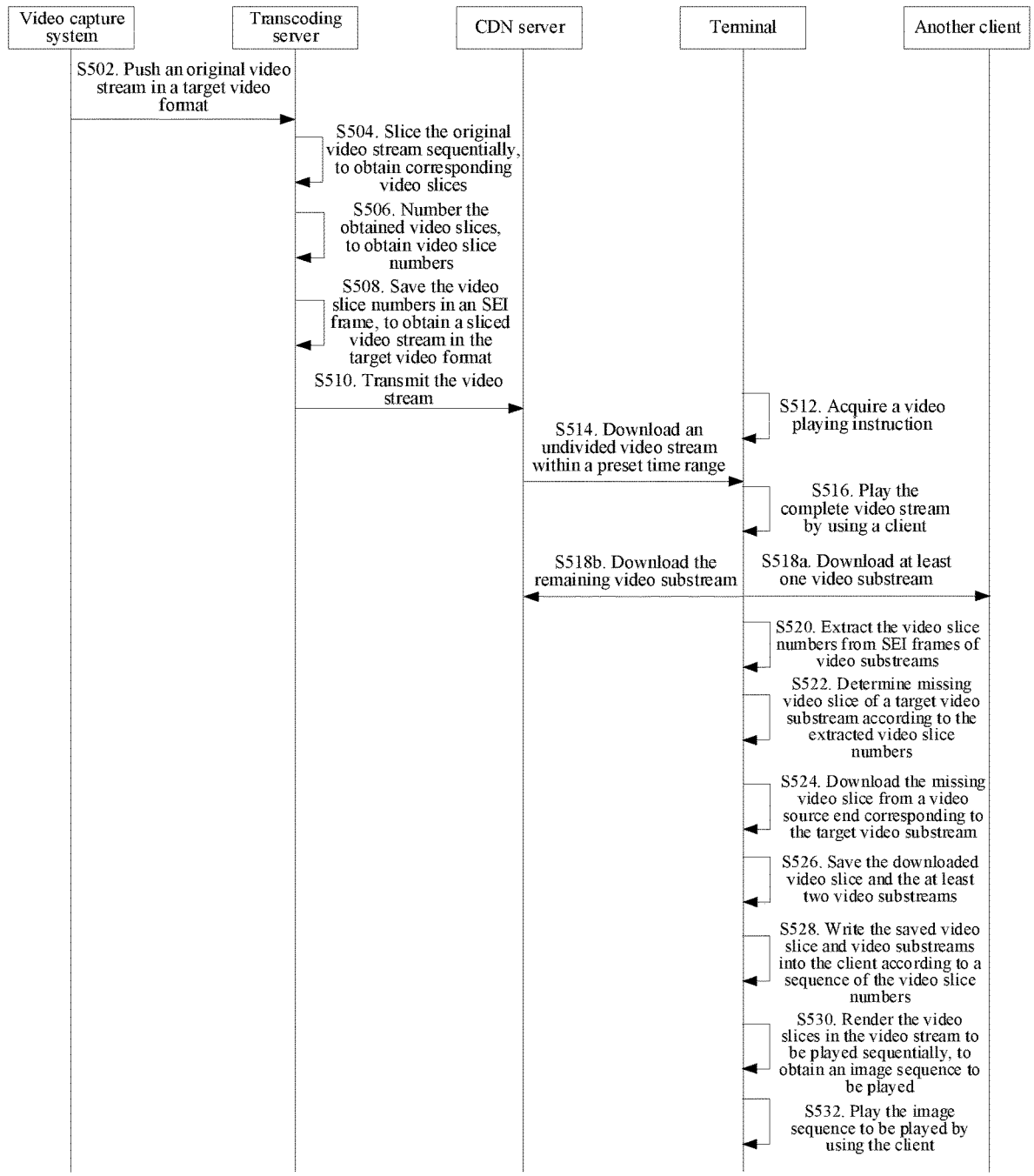
FIG. 5 is a schematic flowchart of a video processing method according to another embodiment.

In an embodiment, as shown in FIG. 5, a video processing method further includes:

S502. A video capture system pushes an original video stream in a target video format to a transcoding server.

S504. The transcoding server receives the original video stream, and then slices the original video stream sequentially, to obtain corresponding video slices.

S506. The transcoding server numbers the obtained video slices, to obtain video slice numbers.

S508. The transcoding server saves the video slice numbers in an SEI frame, to obtain a sliced video stream in the target video format.

S510. The transcoding server transmits the video stream to a target server (that is, a CDN server) in a CDN system, so that the target server returns the corresponding video stream according to a video playing instruction transmitted by a client.

S512. A terminal acquires the video playing instruction.

S514. The terminal downloads, in response to the video playing instruction, an undivided video stream within a preset time range from the target server in the CDN system. Here, an undivided video stream, also referred to as complete video stream, may indicate a video stream being transmitted that is not divided into video substreams.

S516. The terminal plays the undivided video stream by using the client.

S518. The terminal downloads a video stream through at least two channels when the client reaches a stable playing state during playing the undivided video stream, to obtain at least two video substreams.

In an embodiment, S518 may specifically include: The terminal divides a video stream to be downloaded into at least two video substreams; and downloads the at least two video substreams from the target server in the CDN system.

In an embodiment, the method further includes: The terminal establishes a communication connection with at least one another client by using the client. S518 may specifically include: S518*a*. The terminal downloads at least one of the video substreams from a second terminal; and S518*b*. Download one or more remaining video substreams of the video substreams from the target server in the CDN system.

In an embodiment, the step of downloading at least one video substream from the another client may specifically include: The terminal selects at least one candidate video substream from the at least two video substreams; and downloads the candidate video substream from the another client. The method further includes: The terminal pauses the download of the candidate video substream from the target server when determining to download the candidate video substream from the another client.

S520. The terminal extracts the video slice numbers from SEI frames of the video substreams.

S522. The terminal determines a missing video slice missed from a target video substream according to the extracted video slice numbers.

In an embodiment, S522 may specifically include: The terminal determines whether a video slice number is missing in the at least two video substreams; and determines, when the video slice number is missing in at least one video substream, a missing video slice in the at least one video substream according to the missing video slice number.

S524. The terminal downloads the missing video slice from a video source corresponding to the target video substream.

S526. The terminal saves the downloaded video slice and the at least two video substreams.

S528. The terminal writes the saved video slices and video substreams into the client according to a sequence of the video slice numbers, to obtain a corresponding video stream to be played.

Writing into the client refers to loading to the client, for example, loading the saved video slices and video substreams to the client according to a sequence of the video slice numbers.

S530. The terminal renders the video slices in the video stream to be played sequentially, to obtain an image sequence to be played.

S532. The terminal plays the image sequence to be played by using the client.

The original video stream and the video stream may both be video streams in an FLV streaming media format.

Description is given by using an example in which the original live video stream and the live video stream are video streams in an FLV streaming media format.

Figure 6:
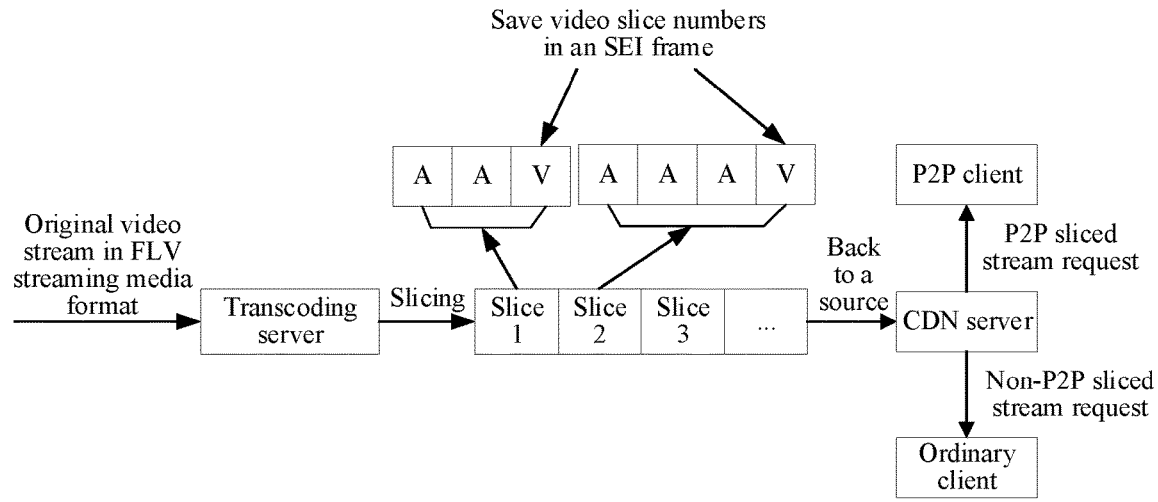
FIG. 6 is a schematic flowchart of performing P2P slicing on an original video stream in a Flash Video (FLU) streaming media format according to an embodiment.

FIG. 6 shows a process of performing P2P slicing on an original live video stream in an FLV streaming media format is provided.

(1) A host pushes a stream to a transcoding server by using a video capture system (such as a computer or a mobile phone).

In addition, automatic stream pushing may be completed according to a user setting or a system configuration requirement. Stream pushing refers to pushing the original live video stream to the transcoding server.

(2) Slicing: The transcoding server numbers a video tag of a video slice, and saves number information (that is, the video slice numbers in the foregoing embodiment) in an SEI frame.

(3) Obtain a sliced live video stream, and then transmit the live video stream to a live CDN server (that is, the target server in the CDN system in the foregoing embodiment).

The live video stream remains in a standard FLV streaming media format.

(4) A P2P client transmits a P2P sliced stream request (a video playing instruction of P2P slicing) to a CDN server, and an ordinary client transmits an flv request (a video playing instruction of non-P2P slicing). The live video stream obtained after P2P slicing still remains in the standard FLV streaming media format. Therefore, the CDN server can unify back to a source when receiving the two requests, that is, the CDN server can acquire the sliced live video stream directly from the transcoding server when receiving the two requests, without acquiring a live video stream in a different video format.

Figure 7:
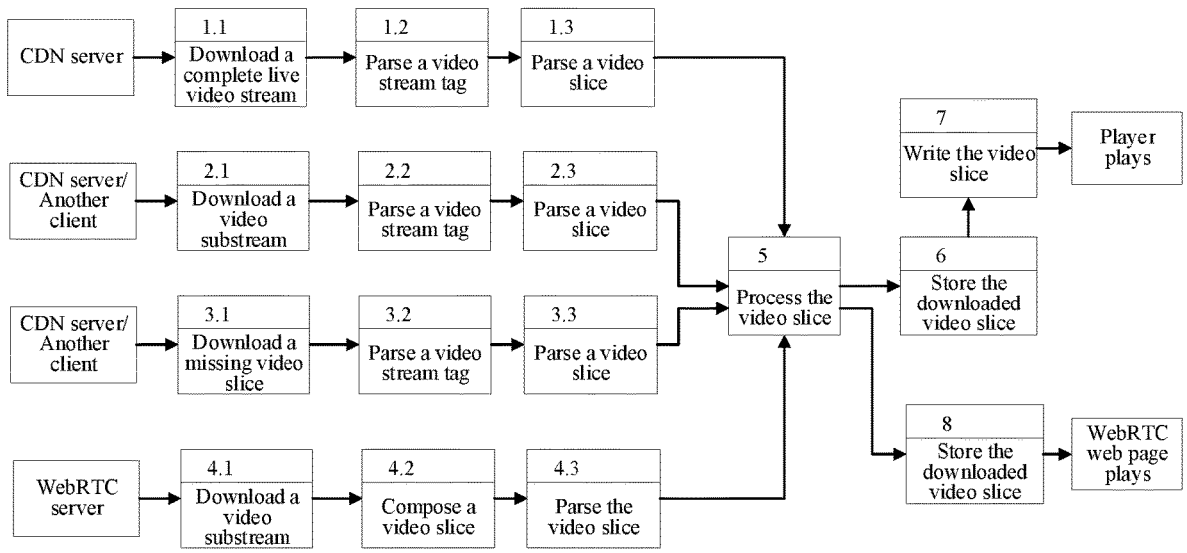
FIG. 7 is a schematic flowchart of a transmission process of a live video stream according to an embodiment.

As shown in FIG. 7, a flowchart of transmission of a live video stream is specifically as follows:

(1) Before livestreaming starts, a terminal downloads a complete live data stream with a fixed duration (corresponding slice numbers are 0, 1, 2, 3, 4, 5, . . . ) from a CDN server, and then plays the live data stream. When a stable playing state is reached, step (2) is performed.

For example, a complete live video stream of 30s is first downloaded, as shown in FIG. 7. Step 1.1. Download a complete live video stream of 30s. Step 1.2. Parse a video stream tag from the complete live video stream. Step 1.3. Parse a video slice from the complete live video stream. Step 5 is performed when step 1.3 is completed, to process the video slice. Step 6. Store the downloaded video slice. Step 7. Write the video slice into the client. Step 8. Play the written video slice by using a client player.

(2) When a stable playing state is reached, the terminal downloads the video stream from a plurality of channels.

For example, the video stream is divided into four video substreams.

| Live Video Stream | Video Slice Numbering Formula | Value Range | Number Information |
| --- | --- | --- | --- |
| Video substream 0 | $4n$ | $n = 0, 1, 2, 3, \ldots$ | 0, 4, 8, . . . |
| Video substream 1 | $4n + 1$ | $n = 0, 1, 2, 3, \ldots$ | 1, 5, 9, . . . |
| Video substream 2 | $4n + 2$ | $n = 0, 1, 2, 3, \ldots$ | 2, 6, 10, . . . |
| Video substream 3 | $4n + 3$ | $n = 0, 1, 2, 3, \ldots$ | 3, 7, 11, . . . |

When the terminal starts downloading the live video stream in a plurality of channels, the live video stream may be downloaded from the CDN server, which is specifically described as follows: Step 2.1. Download a video substream from the CDN server. Step 2.2. Parse a video stream tag from the downloaded video substream. Step 2.3. Parse a video slice from the downloaded video substream. Then, step 5 is performed.

When another client has the live video stream, the live video stream may be downloaded from the another client, which is specifically described in step (3).

(3) The terminal establishes, by using the client, a communication connection with the another client that plays the same live video, and requests a video substream from the another client.

As shown in FIG. 7, the terminal requests video substream 1 (1, 5, 9, . . . ) from the another client. For the specific process, reference may be made to steps 2.1 to 2.3. In addition, when the terminal requests video substream 1 from the another client, the terminal pauses the download of video substream 1 from the CDN server.

(4) Process the video slice: The terminal acquires number information in the SEI frame when receiving data, and determines integrity of the live video stream transmission according to the continuity of data numbers, so as to download a missing video slice in time.

When it is determined that a video slice is missing in a video substream, the missing video slice is downloaded from the CDN server or the another client corresponding to the video substream with the missing video slice, which is specifically shown in FIG. 7. Step 3.1. Download the missing video slice from the CDN server or the another client corresponding to the video substream with the missing video slice. Step 3.2. Parse a video stream tag corresponding to the video slice. Step 3.3. Parse the video slice. After parsing is completed, step 5 is performed.

For example, the terminal requests video substream 0 and actually receives a video substream (0, 4, 8, 16, . . . ). When slice 16 is received, it can be determined that the received video substream is incomplete and a video slice numbered 12 is missing, and video slice 12 is downloaded immediately. In this way, a P2P window can be omitted, which reduces latency and enables ultra-low latency P2P.

(5) Store the downloaded video slice and the live video streams locally, and write them into a player according to a sequence of the video slice numbers, for the player to play.

(6) The terminal establishes a communication connection with the another client by using the client, and the another client transmits a video slice of a corresponding video substream according to the number sequence when the another client transmits the video substream.

In addition, a certain another client (or a local client) may receive requests from a plurality of other clients at the same time, and then the certain another client (or the local client) transmits video slices according to the number sequence to the other clients that transmit the requests.

In an embodiment, when a WebRTC Protocol-based web page plays a video, a video substream is downloaded from a WebRTC server for playing, which is specifically shown in FIG. 7. Step 4.1. Download a video substream from a WebRTC server. Step 4.2. Synthesize a video slice. Step 4.3. Parse the video slice. After parsing is completed, step 5 is performed. Then, step 8 is performed, to store the downloaded video slice for playing in the WebRTC web page.

In the foregoing embodiment, P2P video streaming with lower latency can be achieved with no lag on the premise of ensuring a P2P sharing rate. The latency can be reduced by more than 10s, compared with the existing P2P video streaming technologies.

It is to be understood that although the steps of the flowcharts in FIG. 2 to FIG. 4 are shown sequentially according to arrows, the steps are not necessarily performed in the orders indicated by the arrows. Unless otherwise explicitly specified in the present disclosure, execution of the steps is not strictly limited, and the steps may be performed in other sequences. Moreover, at least a part of the steps in FIG. 2 to FIG. 4 may include a plurality of steps or a plurality of stages. These steps or stages are not necessarily executed at the same time, but may be executed at different times. The order of execution of these steps or stages is not necessarily performed sequentially, but may be performed in turn or alternately with other steps or at least a part of steps or stages of other steps.

Figure 8:
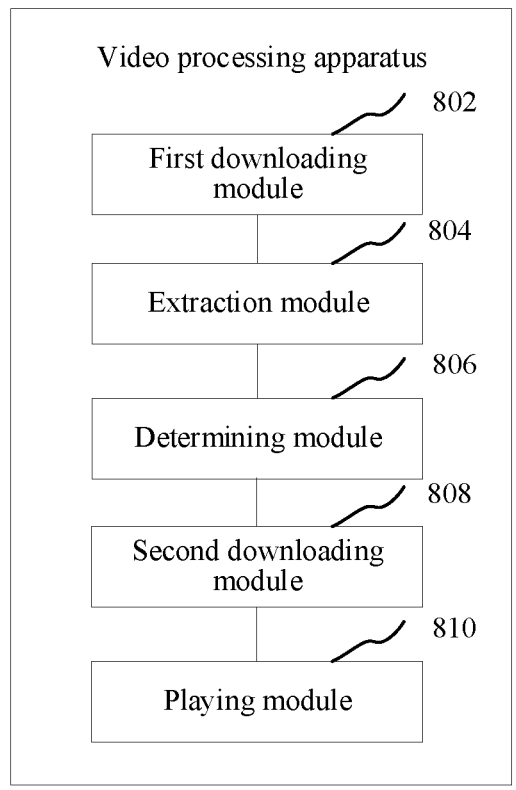
FIG. 8 is a structural block diagram of a video processing apparatus according to an embodiment.

In an embodiment, FIG. 8 shows a video processing apparatus according to an embodiment of the present disclosure. The apparatus may use a software module, or a hardware module, or a combination thereof as part of a computer device. The apparatus specifically includes: a first downloading module 802, an extraction module 804, a determining module 806, a second downloading module 808, and a playing module 810.

The first downloading module 802 is configured to acquire video substreams through at least two channels, to obtain at least two video substreams each having a one-to-one correspondence with one of the at least two channels.

The extraction module 804 is configured to extract video slice numbers from SEI frames of the at least two video substreams.

The determining module 806 is configured to determine a missing video slice missed from a target video substream of the at least two video substreams according to the extracted video slice numbers.

The second downloading module 808 is configured to download the missing video slice from a video source corresponding to the target video substream.

The playing module 810 is configured to play the downloaded video slice and the at least two video substreams according to a sequence of the video slice numbers.

In an embodiment, the first downloading module 802 is further configured to divide a video stream to be downloaded into at least two video substreams, and download the at least two video substreams from a target server in a CDN system through the at least two channels respectively.

Figure 9:
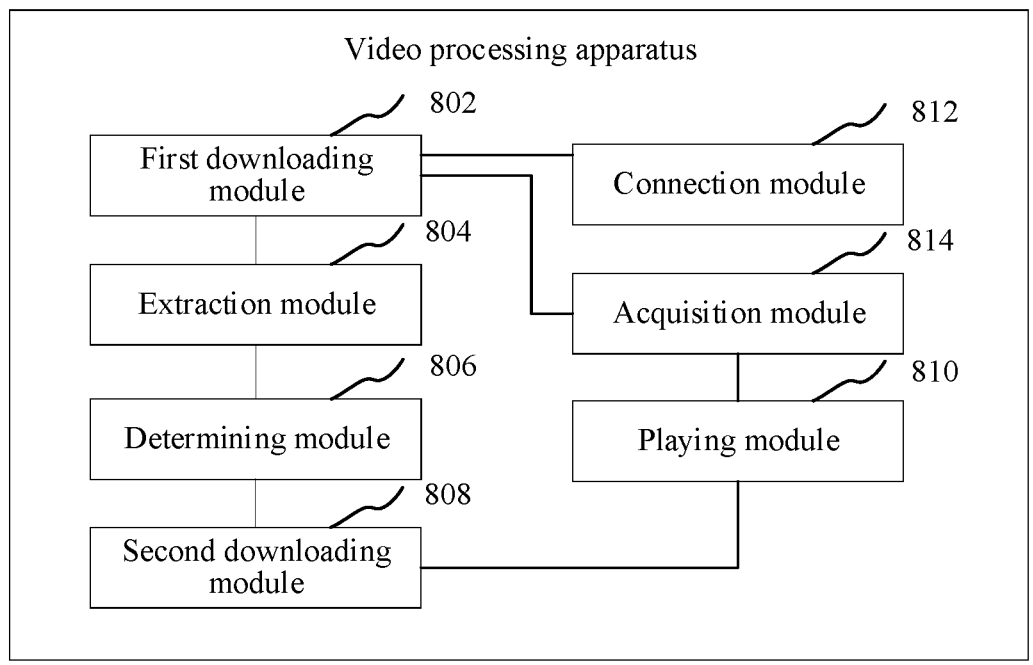
FIG. 9 is a structural block diagram of a video processing apparatus according to another embodiment.

In an embodiment, as shown in FIG. 9, the apparatus further includes: a connection module 812.

The first downloading module 802 is further configured to download at least one of the video substreams from a second terminal; and download one or more remaining video substreams of the video substreams from a target server.

In an embodiment, the first downloading module 802 is further configured to select at least one candidate video substream from the video substreams; download the candidate video substream from the another client; and pause the download of the candidate video substream from the target server when determining to download the candidate video substream from the another client.

In an embodiment, the determining module 806 is further configured to determine whether a video slice number is missing in the at least two video substreams, and determine, when the video slice number is missing in at least one video substream, a missing video slice in the at least one video substream according to the missing video slice number.

In an embodiment, the playing module 810 is configured to save the downloaded video slice and the at least two video substreams, load the saved video slices and video substreams to a client sequentially according to a sequence of the video slice numbers, to obtain a corresponding video stream to be played, render the video slices in the video stream to be played sequentially, to obtain an image sequence to be played, and play the image sequence to be played by using the client.

In an embodiment, the video stream is obtained by a transcoding server slicing an original video stream pushed by a video capture system sequentially, and the video slice numbers are obtained by the transcoding server numbering sliced video slices.

In an embodiment, the original video stream and the video stream both are video streams in an FLU streaming media format.

In the foregoing embodiment, the video stream is downloaded from at least two channels, which can reduce pressure on the server. The video slice numbers are extracted from SEI frames of video substreams, and one of the at least two video substreams in which a video slice is missing can be determined according to the extracted video slice numbers, so that the missing video slice can be quickly replenished from a corresponding video source, which greatly reduces video playing delay time.

In an embodiment, as shown in FIG. 9, the apparatus further includes: an acquisition module 814.

The acquisition module 814 is configured to acquire a video playing instruction before downloading the video stream from the at least two channels.

The first downloading module 802 is further configured to download, in response to the video playing instruction, an undivided video stream within a preset time range from a target server in a CDN system.

The playing module 810 is further configured to play the undivided video stream by using a client.

The first downloading module 802 is further configured to download a video stream through the at least two channels when the client reaches a stable playing state during playing the undivided video stream.

In the foregoing embodiment, at an initial period of video playing, an undivided video stream is first downloaded from the target server in the CDN system for playing, to avoid lagging. When the client reaches the stable playing state, the video stream is downloaded from different streams, which can reduce pressure on the server.

Figure 10:
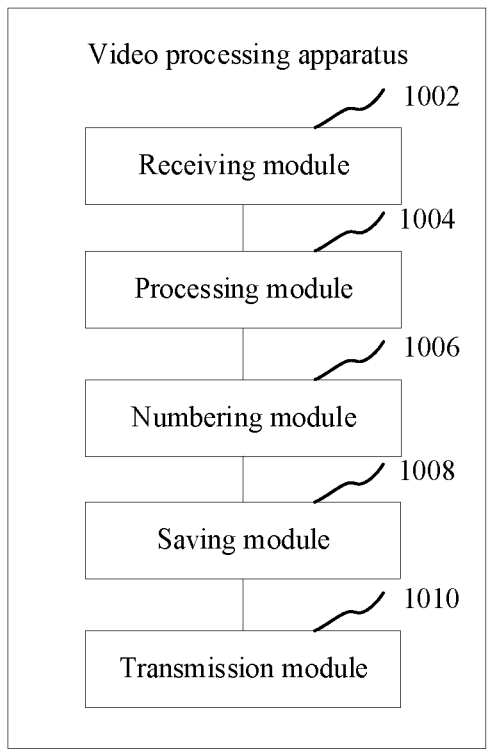
FIG. 10 is a structural block diagram of a video processing apparatus according to another embodiment.

In an embodiment, FIG. 10 shows a video processing apparatus according to an embodiment of the present disclosure. The apparatus may use a software module, or a hardware module, or a combination thereof as part of a computer device. The apparatus specifically includes: a receiving module 1002, a processing module 1004, a numbering module 1006, a saving module 1008, and a transmission module 1010.

The receiving module 1002 is configured to receive an original video stream in a target video format pushed by a video capture system.

The processing module 1004 is configured to slice the original video stream sequentially, to obtain corresponding video slices.

The numbering module 1006 is configured to number the obtained video slices, to obtain video slice numbers.

The saving module 1008 is configured to save the video slice numbers in an SEI frame, to obtain a sliced video stream in the target video format.

The transmission module 1010 is configured to transmit the video stream to a target server in a CDN system, so that the target server returns the corresponding video stream according to a video playing instruction transmitted by a client.

In an embodiment, the original video stream and the video stream may both be video streams in an FLU streaming media format.

In the foregoing embodiment, the original video stream pushed by the video capture system is sliced, the obtained video slices are numbered, and the obtained video slice numbers are saved in the SEI frame, so that the client can determine whether there is a missing video slice by using the video slice numbers in the SEI frame, and the client can replenish the missing video slice in time, which reduces delay time when the client plays a video.

For a specific limitation on the video processing apparatus, reference may be made to the limitation on the video processing method above. Details are not described herein again. All or part of the modules in the video processing apparatus may be implemented by software, hardware, or a combination thereof. The foregoing modules may be built in or independent of a processor of a computer device in a hardware form, or may be stored in a memory of the computer device in a software form, so that the processor invokes and performs the operations corresponding to the foregoing modules.

In an embodiment, a computer device is provided. The computer device may be a terminal. An internal structure diagram of the computer device may be shown in FIG. 11. The computer device includes a processor, a memory, a communication interface, a display screen, and an input apparatus that are connected through a system bus. The processor of the computer device is configured to provide computing and control capabilities. The memory of the computer device includes a non-volatile storage medium and an internal memory. The non-volatile storage medium stores an operating system and a computer program. The internal memory provides an environment for running of the operating system and the computer program in the non-volatile storage medium. The communication interface of the computer device is configured to communicate with an external terminal in a wired or wireless manner. The wireless manner may be implemented by using Wi-Fi, a carrier network, near-field communication (NFC), or other technologies. The computer program is executed by the processor to implement a video processing method. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 11:
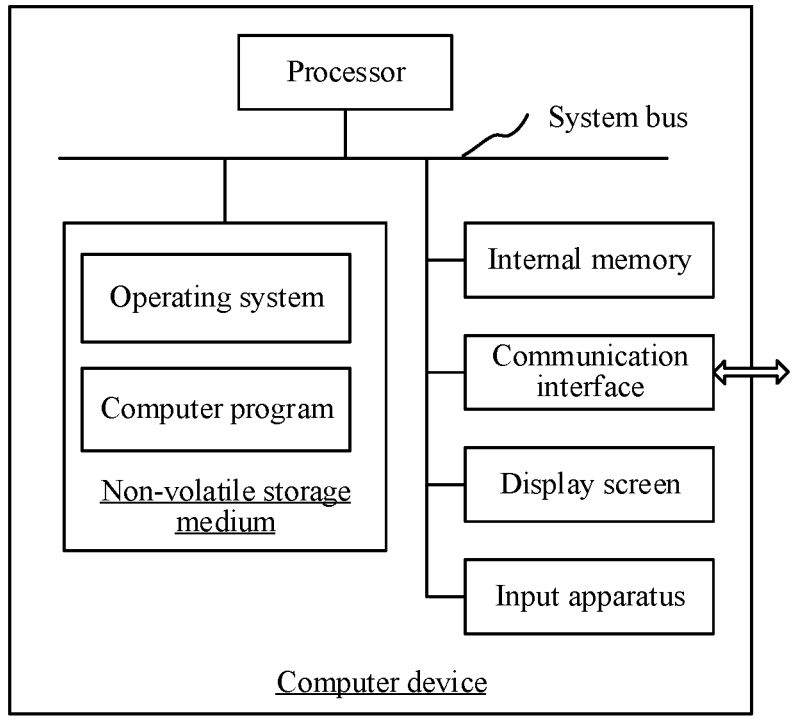
FIG. 11 is an internal structure diagram of a computer device according to an embodiment.

A person skilled in the art may understand that, the structure shown in FIG. 11 is only a block diagram of a part of the structure related to the solution of the present disclosure and does not limit the computer device to which the solution of the present disclosure is applied. Specifically, the computer device may include more or fewer components than those in the drawings, or combine some components, or have different component layouts.

In an embodiment, a computer device is further provided, including a memory and a processor, the memory storing a computer program, the processor, when executing the computer program, performing the following operations: acquiring video substreams through at least two channels, to obtain at least two video substreams each having a one-to-one correspondence with one of the at least two channels; extracting video slice numbers from SEI frames of the at least two video substreams; determining a missing video slice missed from a target video substream of the at least two video substreams according to the extracted video slice numbers; downloading the missing video slice from a video source corresponding to the target video substream; and playing the downloaded video slice and the at least two video substreams according to a sequence of the video slice numbers.

In an embodiment, the computer program, when executed by the processor, causes the processor to further perform the following operations: acquiring a video playing instruction; downloading, in response to the video playing instruction, an undivided video stream within a preset time range from a target server in a CDN system; playing the undivided video stream by using a client; and downloading a video stream through the at least two channels when the client reaches a stable playing state during playing the undivided video stream.

In an embodiment, the computer program, when executed by the processor for the operation of downloading a video stream through at least two channels, causes the processor to perform the following operations: dividing a video stream to be downloaded into at least two video substreams; and downloading the at least two video substreams from a target server of a CDN system.

In an embodiment, the computer program, when executed by the processor for the operation of downloading a video stream through at least two channels, causes the processor to perform the following operations: downloading at least one of the video substreams from a second terminal; and downloading one or more remaining video substreams of the video substreams from a target server in a CDN system.

In an embodiment, the computer program, when executed by the processor for the operation of downloading at least one of the video substreams from a second terminal, causes the processor to perform the following operations: selecting at least one candidate video substream from the at least two video substreams; and downloading the candidate video substream from the another client. The computer program, when executed by the processor, causes the processor to further perform the following operation: pausing the download of the candidate video substream from the target server when determining to download the candidate video substream from the another client.

In an embodiment, the computer program, when executed by the processor for the operation of determining a missing video slice missed from a target video substream of the at least two video substreams according to the extracted video slice numbers, causes the processor to perform the following operations: determining whether a video slice number is missing in the at least two video substreams miss a video slice number; and determining, when the video slice number is missing in at least one video substream, a missing video slice in the at least one video substream according to the missing video slice number.

In an embodiment, the computer program, when executed by the processor for the operation of loading the downloaded video slice and the at least two video substreams to the client for playing according to a sequence of the video slice numbers, causes the processor to perform the following operations: saving the downloaded video slice and the at least two video substreams; loading the saved video slices and video substreams to the client sequentially according to a sequence of the video slice numbers, to obtain a corresponding video stream to be played; rendering the video slices in the video stream to be played sequentially, to obtain an image sequence to be played; and playing the image sequence to be played by using the client.

In an embodiment, the video stream is obtained by a transcoding server slicing an original video stream pushed by a video capture system sequentially; and the video slice numbers are obtained by the transcoding server numbering sliced video slices.

In an embodiment, the original video stream and the video stream both are video streams in an FLU streaming media format.

In an embodiment, a computer-readable storage medium is provided, storing a computer program, the computer program, when executed by a processor, performing the following operations: acquiring video substreams through at least two channels, to obtain at least two video substreams each having a one-to-one correspondence with one of the at least two channels; extracting video slice numbers from SEI frames of the at least two video substreams; determining a missing video slice missed from a target video substream of the at least two video substreams according to the extracted video slice numbers; downloading the missing video slice from a video source corresponding to the target video substream; and playing the downloaded video slice and the at least two video substreams according to a sequence of the video slice numbers.

In an embodiment, the computer program, when executed by the processor, causes the processor to further perform the following operations: acquiring a video playing instruction; downloading, in response to the video playing instruction, an undivided video stream within a preset time range from a target server in a CDN system; playing the undivided video stream by using a client; and downloading a video stream through the at least two channels when the client reaches a stable playing state during playing the undivided video stream.

In an embodiment, the computer program, when executed by the processor for the operation of downloading a video stream through at least two channels, causes the processor to perform the following operations: dividing a video stream to be downloaded into at least two video substreams; and downloading the at least two video substreams from a target server in a CDN system through the at least two channels respectively.

In an embodiment, the computer program, when executed by the processor for the operation of downloading a video stream through at least two channels, causes the processor to perform the following operations: downloading at least one of the video substreams from a second terminal; and downloading one or more remaining video substreams of the video substreams from a target server in a CDN system.

In an embodiment, the computer program, when executed by the processor for the operation of downloading at least one of the video substreams from a second terminal, causes the processor to perform the following operations: selecting at least one candidate video substream from the video substreams; and downloading the candidate video substream from the another client. The computer program, when executed by the processor, causes the processor to further perform the following operation: pausing the download of the candidate video substream from the target server when determining to download the candidate video substream from the another client.

In an embodiment, the computer program, when executed by the processor for the operation of determining a missing video slice missed from a target video substream of the at least two video substreams according to the extracted video slice numbers, causes the processor to perform the following operations: determining whether a video slice number is missing in the at least two video substreams; and determining, when the video slice number is missing in at least one video substream, a missing video slice in the at least one video substream according to the missing video slice number.

In an embodiment, the computer program, when executed by the processor for the operation of playing the downloaded video slice and the at least two video substreams according to a sequence of the video slice numbers, causes the processor to perform the following operations: saving the downloaded video slice and the at least two video substreams; loading the saved video slices and video substreams to a client according to a sequence of the video slice numbers, to obtain a corresponding video stream to be played; rendering the video slices in the video stream to be played sequentially, to obtain an image sequence to be played; and playing the image sequence to be played by using the client.

In an embodiment, the video stream is obtained by a transcoding server slicing an original video stream pushed by a video capture system sequentially; and the video slice numbers are obtained by the transcoding server numbering sliced video slices.

In an embodiment, the original video stream and the video stream both are video streams in an FLU streaming media format.

Figure 12:
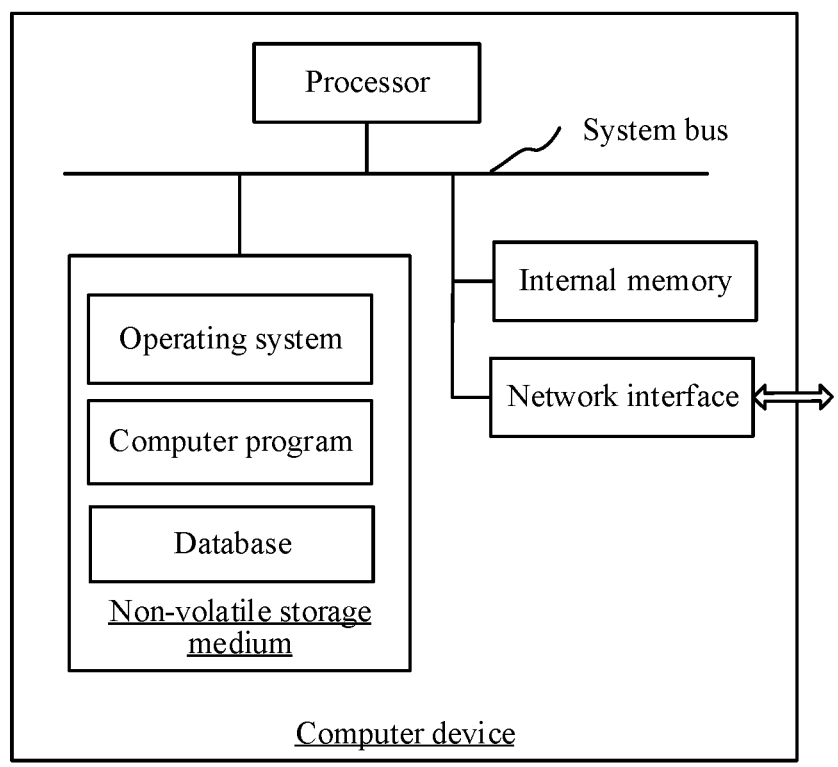
FIG. 12 is an internal structure diagram of a computer device according to another embodiment.

In an embodiment, a computer device is provided. The computer device may be a transcoding server. An internal structure diagram of the computer device may be shown in FIG. 12. The computer device includes a processor, a memory, and a network interface that are connected through a system bus. The processor of the computer device is configured to provide computing and control capabilities. The memory of the computer device includes a non-volatile storage medium and an internal memory. The non-volatile storage medium stores an operating system, a computer program, and a database. The internal memory provides an environment for running of the operating system and the computer program in the non-volatile storage medium. The database of the computer device is configured to store video stream data. The network interface of the computer device is configured to communicate with and connect to an external terminal through a network. The computer program is executed by the processor to implement a video processing method.

In an embodiment, a computer device is further provided, including a memory and a processor, the memory storing a computer program, the processor, when executing the computer program, performing the following operations: receiving an original video stream in a target video format pushed by a video capture system; slicing the original video stream sequentially, to obtain corresponding video slices; numbering the obtained video slices, to obtain video slice numbers; saving the video slice numbers in an SEI frame, to obtain a sliced video stream in the target video format; and transmitting a video stream to a target server, so that the target server returns the corresponding video stream according to a video playing instruction transmitted by a client.

In an embodiment, the original video stream and the video stream both are video streams in an FLV streaming media format.

In an embodiment, a computer-readable storage medium is provided, storing a computer program, the computer program, when executed by a processor, performing the following operations: receiving an original video stream in a target video format pushed by a video capture system; slicing the original video stream sequentially, to obtain corresponding video slices; numbering the obtained video slices, to obtain video slice numbers; saving the video slice numbers in an SEI frame, to obtain a sliced video stream in the target video format; and transmitting a video stream to a target server, so that the target server returns the corresponding video stream according to a video playing instruction transmitted by a client.

In an embodiment, the original video stream and the video stream both are video streams in an FLV streaming media format.

A person of ordinary skill in the art may understand that some or all procedures in the foregoing method embodiments may be implemented by a computer program instructing related hardware. The computer program may be stored in a non-volatile computer-readable storage medium, and when the computer program is executed, the procedures of the foregoing method embodiments may be performed. Any reference to a memory, a storage, a database, or another medium used in the embodiments provided in the present disclosure may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

The technical features in the foregoing embodiment may be combined in different manners to form other embodiments. For concise description, not all possible combinations of the technical features in the embodiments are described. However, provided that combinations of the technical features do not conflict with each other, the combinations of the technical features are considered as falling within the scope described in this specification.

The foregoing embodiments only describe several implementations of the present disclosure, and the description is relatively specific and detailed, but cannot be construed as a limitation to the patent scope of the present disclosure. A person of ordinary skill in the art may further make several variations and improvements without departing from the ideas of the present disclosure, and such variations and improvements all fall within the protection scope of the present disclosure. Therefore, the protection scope of the present disclosure shall be subject to the protection scope of the appended claims.

What is claimed is:

1. A video processing method, performed by a first terminal, the method comprising:
   acquiring a video playing instruction;
   downloading, in response to the video playing instruction, an undivided video stream of a first part of a video from a target server in a content delivery network (CDN) system;
   playing the undivided video stream by using a client application executed on the first terminal; and
   in response to the client application reaches a stable playing state during playing the undivided video stream of the first part of the video, acquiring video substreams divided from data streams of a second part of the same video through at least two channels, to obtain at least two video substreams each having a one-to-one correspondence with one of the at least two channels, the at least two channels including another client installed on a terminal other than the first terminal;
   extracting video slice numbers from supplemental enhancement information (SEI) frames of the at least two video substreams;
   determining a missing video slice missed from a target video substream of the at least two video substreams according to the extracted video slice numbers;
   downloading the missing video slice from a video source corresponding to the target video substream; and
   playing the downloaded video slice and the at least two video substreams according to a sequence of the video slice numbers.

2. The method according to claim 1, wherein
   the undivided video stream of the first part of the video is within a preset time range, and the video substreams divided from the data streams of the second part of the video is outside the preset time range.

3. The method according to claim 1, wherein the acquiring video substreams through at least two channels, to obtain at least two video substreams each having a one-to-one correspondence with one of the at least two channels comprises:
   dividing a video stream to be downloaded into at least two video substreams; and
   downloading the at least two video substreams from a target server in a CDN system through the at least two channels respectively.

4. The method according to claim 1, wherein the acquiring video substreams through at least two channels comprises:
   downloading at least one of the video substreams from a second terminal; and
   downloading one or more remaining video substreams of the video substreams from a target server in a CDN system.

5. The method according to claim 4, wherein the downloading at least one of the video substreams from a second terminal comprises:
   selecting at least one candidate video substream from the at least two video substreams; and
   downloading the candidate video substream from the second terminal; and
   the method further comprises: pausing the download of the candidate video substream from the target server when determining to download the candidate video substream from the second terminal.

6. The method according to claim 1, the determining a missing video slice missed from a target video substream of the at least two video substreams according to the extracted video slice numbers comprising:
   determining whether a video slice number is missing in the at least two video substreams; and
   determining, when the video slice number is missing in at least one video substream, the missing video slice in the at least one video substream according to the missing video slice number.

7. The method according to claim 1, wherein the playing the downloaded video slice and the at least two video substreams according to a sequence of the video slice numbers comprises:
   saving the downloaded video slice and the at least two video substreams;
   loading the saved video slice and video substreams to a client application sequentially according to a sequence of the video slice numbers, to obtain a corresponding video stream to be played;
   rendering the loaded video slices in the video stream to be played sequentially, to obtain an image sequence to be played; and
   playing the image sequence to be played by using the client application.

8. The method according to claim 1, wherein the video stream is obtained by the server sequentially slicing an original video stream, the original video stream is pushed by a video capture system to the server; and the video slice numbers of video slices are numbered by the server.

9. The method according to claim 8, wherein the original video stream and the video stream both are video streams in a Flash Video (FLU) streaming media format.

10. A video processing apparatus, comprising a memory and a processor coupled to the memory, the processor is configured to:
    acquire a video playing instruction;
    download, in response to the video playing instruction, an undivided video stream of a first part of a video from a target server in a content delivery network (CDN) system;
    play the undivided video stream by using a client application executed on the first terminal; and
    in response to the client application reaches a stable playing state during playing the undivided video stream of the first part of the video, acquire video substreams divided from data streams of a second part of the same video through at least two channels, to obtain at least two video substreams each having a one-to-one correspondence with one of the at least two channels, the at least two channels including another client installed on a terminal other than the first terminal;
    extract video slice numbers from supplemental enhancement information (SEI) frames of the at least two video substreams;
    determine a missing video slice missed from a target video substream of the at least two video substreams according to the extracted video slice numbers;
    download the missing video slice from a video source corresponding to the target video substream; and play the downloaded video slice and the at least two video substreams according to a sequence of the video slice numbers.

11. The apparatus according to claim 10, wherein the undivided video stream of the first part of the video is within a preset time range, and the video substreams divided from the data streams of the second part of the video is outside the preset time range.

12. The apparatus according to claim 10, wherein the processor is further configured to:
divide a video stream to be downloaded into at least two video substreams; and
download the at least two video substreams from a target server in a CDN system through the at least two channels respectively.

13. The apparatus according to claim 10, wherein the processor is further configured to download at least one of the video substreams from a second terminal, and download one or more remaining video substreams of the video substreams from a target server in a CDN system.

14. The apparatus according to claim 13, wherein the processor is further configured to select at least one candidate video substream from the at least two video substreams, download the candidate video substream from the second terminal, and pause the download of the candidate video substream from the target server when determining to download the candidate video substream from the second terminal.

15. The apparatus according to claim 10, wherein the processor is further configured to determine whether a video slice number is missing in the at least two video substreams, and determine, when the video slice number is missing in at least one video substream, the missing video slice in the at least one video substream according to the missing video slice number.

16. The apparatus according to claim 10, wherein the processor is further configured to save the downloaded video slice and the at least two video substreams, load the saved video slices and video substreams to a client application sequentially according to a sequence of the video slice numbers, to obtain a corresponding video stream to be played, render the loaded video slices in the video stream to be played sequentially, to obtain an image sequence to be played, and play the image sequence to be played by using the client application.

17. The apparatus according to claim 10, wherein the video stream is obtained by the server sequentially slicing an original video stream, the original video stream is pushed by a video capture system to the server; and the video slice numbers of video slices are numbered by the server.

18. The apparatus according to claim 17, wherein the original video stream and the video stream both are video streams in a Flash Video (FLU) streaming media format.

19. A non-transitory computer-readable storage medium, storing a computer program, the computer program, when executed by a processor, performing operations comprising:
acquiring a video playing instruction;
downloading, in response to the video playing instruction, an undivided video stream of a first part of a video from a target server in a content delivery network (CDN) system;
playing the undivided video stream by using a client application executed on the first terminal; and
in response to the client application reaches a stable playing state during playing the undivided video stream of the first part of the video, acquiring video substreams divided from data streams of a second part of the same video through at least two channels, to obtain at least two video substreams each having a one-to-one correspondence with one of the at least two channels, the at least two channels including another client installed on a terminal other than the first terminal;
extracting video slice numbers from supplemental enhancement information (SEI) frames of the at least two video substreams;
determining a missing video slice missed from a target video substream of the at least two video substreams according to the extracted video slice numbers;
downloading the missing video slice from a video source corresponding to the target video substream; and
playing the downloaded video slice and the at least two video substreams according to a sequence of the video slice numbers.

20. The storage medium according to claim 19, wherein the undivided video stream of the first part of the video is within a preset time range, and the video substreams divided from the data streams of the second part of the video is outside the preset time range.

* * * * *